United States Patent
Truong et al.

(10) Patent No.: US 11,455,608 B2
(45) Date of Patent: Sep. 27, 2022

(54) OPERATING MODES FOR A POINT OF SALE PERIPHERAL DEVICE

(71) Applicant: Hewlett-Packard Development Company, L.P., Spring, TX (US)

(72) Inventors: Binh T. Truong, Spring, TX (US); Pun Yi Lee, Spring, TX (US); Adrian L. Patschke, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 29 days.

(21) Appl. No.: 16/656,979

(22) Filed: Oct. 18, 2019

(65) Prior Publication Data

US 2021/0117945 A1 Apr. 22, 2021

(51) Int. Cl.
*G06Q 20/20* (2012.01)
*G07G 1/12* (2006.01)
*G07G 1/00* (2006.01)

(52) U.S. Cl.
CPC .......... *G06Q 20/20* (2013.01); *G07G 1/0009* (2013.01); *G07G 1/12* (2013.01)

(58) Field of Classification Search
CPC ......... G06Q 20/20; G07G 1/0009; G07G 1/12
See application file for complete search history.

(56) References Cited

U.S. PATENT DOCUMENTS

| | | | | |
|---|---|---|---|---|
| 5,038,320 A | * | 8/1991 | Heath | G06F 9/4411 710/10 |
| 6,845,363 B1 | * | 1/2005 | Matsubara | G06Q 20/20 705/16 |
| 7,653,446 B2 | | 1/2010 | Philyaw | |
| 9,606,758 B1 | * | 3/2017 | Chandler | G06F 3/1226 |
| 9,978,049 B2 | * | 5/2018 | Dunstan | G07F 17/329 |
| 10,068,550 B1 | * | 9/2018 | Chen | G06Q 20/3278 |
| 2004/0030880 A1 | | 2/2004 | Kitagawa | |
| 2004/0222301 A1 | * | 11/2004 | Willins | G06K 7/10851 235/472.01 |
| 2004/0249718 A1 | * | 12/2004 | Kuroda | G07F 5/24 705/17 |
| 2005/0038705 A1 | * | 2/2005 | Yamada | G07G 1/14 705/16 |

(Continued)

FOREIGN PATENT DOCUMENTS

JP 06208525 1/2010

OTHER PUBLICATIONS

HP Point of Sale (POS) Peripherals Configuration Guide. Version 3.89. Oct. 2017. (Year: 2017).*

(Continued)

*Primary Examiner* — Nathan A Mitchell
(74) *Attorney, Agent, or Firm* — Brooks Cameron & Huebsch PLLC

(57) ABSTRACT

In some examples, a device for applying an operating mode to a point of sale (POS) peripheral device can include a non-transitory machine readable medium storing instructions executable by a processing resource to detect a peripheral device, access a configuration file based on the detected peripheral device, wherein the configuration file includes a plurality of operating modes associated with the detected peripheral device, and apply one of the plurality of operating modes to the detected peripheral device.

15 Claims, 3 Drawing Sheets

(56) References Cited

U.S. PATENT DOCUMENTS

| | | | |
|---|---|---|---|
| 2007/0067659 A1* | 3/2007 | Tevanian, Jr. | G06F 1/266 713/324 |
| 2007/0174499 A1* | 7/2007 | Bhella | H04L 67/34 710/15 |
| 2009/0037940 A1* | 2/2009 | Ng | G07G 1/0009 719/327 |
| 2010/0146155 A1* | 6/2010 | Brock | G06F 9/4411 710/11 |
| 2012/0054046 A1* | 3/2012 | Albisu | G06Q 20/385 705/16 |
| 2012/0226829 A1* | 9/2012 | Takahashi | G06F 9/4411 710/10 |
| 2014/0089527 A1* | 3/2014 | Chandler | G06F 3/1289 710/3 |
| 2014/0215097 A1* | 7/2014 | Yamamoto | G06F 3/1205 710/8 |
| 2016/0127600 A1* | 5/2016 | Beatty | H04W 4/80 358/1.15 |
| 2016/0292660 A1* | 10/2016 | Yu | G07G 1/12 |
| 2016/0364710 A1* | 12/2016 | Kim | G07G 1/12 |
| 2017/0012472 A1* | 1/2017 | Matsuno | H02J 50/12 |
| 2017/0075840 A1* | 3/2017 | Matsuno | G06F 13/102 |
| 2017/0372286 A1* | 12/2017 | Hiroi | G07G 1/0009 |
| 2018/0316815 A1* | 11/2018 | Douthat | G06F 1/3287 |
| 2019/0005477 A1* | 1/2019 | Sanders | G06Q 30/0601 |
| 2019/0034134 A1* | 1/2019 | Kawakami | H04W 52/0216 |
| 2020/0265398 A1* | 8/2020 | Lembo | G06F 1/26 |

OTHER PUBLICATIONS

"Description of bios setup utility v 02.67. How to avoid a system crash. Integrated Peripherals—Built-in Peripherals", Heading: Hardware solutions , Jan. 15, 2018 , Crabo.ru.

John Poulson , "Instructions for Switching from MSD to HID (Windows, Mac & Linux) ", Wibu-Systems , Apr. 22, 2013 , USA.

* cited by examiner

OPERATING MODES FOR A POINT OF SALE PERIPHERAL DEVICE

BACKGROUND

A point of sale (POS) is a time and place a retail transaction is completed. A POS computing device is the device used to complete the transaction. A POS system can include a cash register including, for instance, a computer, monitor, cash drawer, receipt printer, customer display, card reader, and/or barcode scanner, among others.

DETAILED DESCRIPTION

Point of sale (POS) computing devices can be connected to a number of POS peripheral devices that can enhance the retail experience for both the retailer and the purchaser. Example POS peripheral devices can include, for instance, cash drawers, keyboards, displays, card readers, receipt printers, scanners, scales, etc. These POS peripheral devices can be controlled (e.g., enabling/disabling functions) via the POS computing device.

POS peripheral devices can have the capability to operate in a number of operating modes. For example, a receipt printer can be programmed to operate in a communication (COM) mode, human interface device (HID) mode, composite mode, printer class mode, or native mode, while a scanner can be programmed to operate in COM mode, HID mode, composite mode, or keyboard mode.

As such, the disclosure is directed to applying an operating mode to a POS peripheral device. For example, a computing device can include a non-transitory machine readable medium storing instructions executable by a processing resource to detect a peripheral device, access a configuration file based on the detected peripheral device, wherein the configuration file includes a plurality of operating modes associated with the detected peripheral device, and apply one of the plurality of operating modes to the detected peripheral device.

Figure 1:
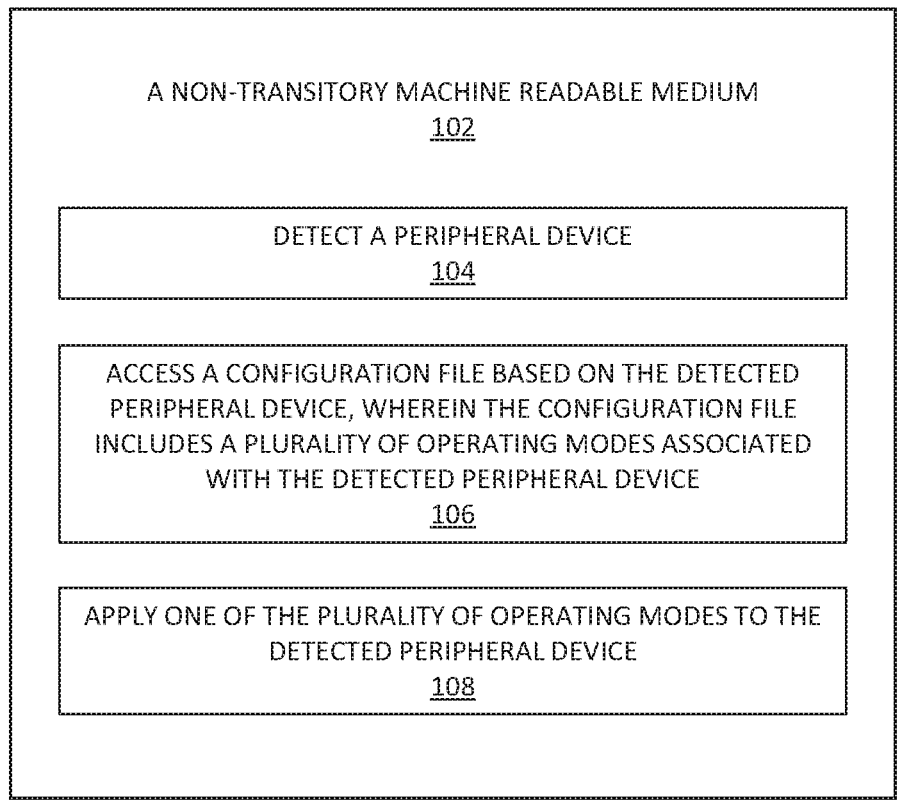
FIG. 1 illustrates an example of a memory resource storing instructions for applying an operating mode to a point of sale peripheral device consistent with the disclosure.

FIG. 1 illustrates an example of a memory resource 102 storing instructions 104, 106, 108 for applying an operating mode to a point of sale peripheral device consistent with the disclosure. In some examples, the memory resource 102 can be utilized to store instructions 104, 106, 108 that can be executed by a processing resource. For example, the memory resource 102 may be communicatively coupled to a processing resource which may be a central processing unit (CPU), a semiconductor-based microprocessor, and/or other hardware devices suitable for retrieval and execution of instructions 104, 106, 108 stored in the memory resource 102 (e.g., in a non-transitory computer readable medium). The example processing resource may fetch, decode, and execute instructions. As an alternative, or in addition to, retrieving and executing instructions, the example processor may include an electronic circuit that may include electronic components for performing the functionality of executed instructions.

In some examples, the processing resource may be a plurality of hardware processing units that may cause machine-readable instructions to be executed. The processing resource may include central processing units (CPUs) among other types of processing units. The memory resource 102 may be any type of volatile or non-volatile memory or storage, such as random-access memory (RAM), flash memory, storage volumes, a hard disk, or a combination thereof.

The memory resource 102 may store instructions thereon, such as instructions 104, 106, and 108. When executed by the processing resource, the instructions may cause a computing device to perform specific tasks and/or functions. For example, the memory resource 102 may store instructions 104 which may be executed by the processing resource to cause the computing device (e.g., a POS computing device) to detect a peripheral device (e.g., a POS peripheral device). The computing device and the peripheral device can be associated with a POS system, where the POS system can comprise a number of POS devices which can enhance the retail experience for both the retailer and the purchaser. For instance, the POS system can comprise a number of devices utilized to accept payments, track sales, manage inventory, and keep track of customer data, among other POS functions.

As used herein, a computing device can be a mechanical or electrical device that transmits or modifies energy to perform or assist in the performance of human tasks. Examples include cash registers, personal computers, laptops, tablets, smartphones, mobile devices, and digital notebooks, among others. A computing device can be coupled to a number of peripheral devices. As used herein, a peripheral device can be an ancillary device used to put information into and get information out of the computing device. Examples include keyboards, receipt printers, scanners, bar code scanners, displays, card readers, among others.

The computing device can use a basic input/output system (BIOS) initialization code to detect the peripheral device. The BIOS may be a different type of system, such as a unified extensible firmware interface (UEFI). In some examples, a BIOS can power on a computing system and establish a connection via a universal serial bus power delivery (USB PD) controller. In some examples, the BIOS can detect the peripheral device and establish a connection, via the USB PD controller, between the computing device and the peripheral device.

The computing device can detect the peripheral device upon start-up of the computing device by detecting a device classification and/or a device identification code of a peripheral device. In such an example, upon start-up of the computing device, the computing device can scan the device classification and/or a device identification code of the peripheral device. Scanning the device classification and/or a device identification code of the peripheral device can include the BIOS communicating with a platform input/output (IO) (e.g., USB ports) to determine what device(s) is detected and performing a search of a USB device table (e.g., a SMBIOS table) to detect the peripheral device. This can allow for the computing device to automatically detect that a peripheral device is coupled to the computing device, as well as determine the device classification and/or type (e.g., a keyboards, receipt printers, scanners, bar code scanners, displays, card readers, etc.) of the peripheral device.

Individual types of peripheral devices can correspond with a device classification. Device classifications can include a POS printer device class, a scanner device class, and a line display device class, among others. For example, a receipt printer can correspond to a POS printer device class, while a barcode scanner can correspond to a scanner device class. Thus, if a receipt printer is connected to the computing device, the computing device may detect a peripheral device corresponding to the POS printer device class. In another example, if a barcode scanner is connected to the computing device, the computing device may detect a peripheral device corresponding to the scanner device class.

Peripheral devices can also include a device identification code that is associated with it. For example, each individual peripheral device can have a device identification code associated with it. The device identification code can indicate the type of peripheral device and/or the device classification of the peripheral device. Thus, the computing device can detect that a peripheral device is coupled to the computing device, as well as determine the device classification and/or type of peripheral device by scanning the device identification code associated with the peripheral device.

The memory resource 102 may store instructions 106 which may be executed by a processing resource to access a configuration file based on the detected peripheral device, wherein the configuration file includes a number of operating modes (e.g., user interfaces) associated with the detected peripheral device. Configuration files can be stored within a local database, which may be accessed by the computing device. For example, the configuration file can be stored within a system management basic input/output system (SMBIOS) table.

A peripheral device can be associated with a configuration file. As used herein, a configuration file provides the parameters and initial settings for an operating system. Configuration files can be accessed at the start-up of the operating system. For example, upon start-up of the computing device, a configuration file can be accessed via the computing device and the computing device can apply the parameters and initial settings as indicated by the configuration file. Different types/device classifications of peripheral devices can be associated with different configuration files. For example, a receipt printer can be associated with a first configuration file, while a barcode scanner can be associated with a second configuration file. Thus, the computing device can access the configuration file associated with the detected peripheral device, where the configuration file can be stored within the SMBIOS table. A SMBIOS table can store information about a computing device and its capabilities.

A configuration file can include a plurality of operating modes. As used herein, the term operating mode can refer to a distinct setting within a computer program or a physical machine interface, in which an input will produce perceived results different from those that it would in other settings. As described herein, the plurality of operating modes can include a COM mode, a keyboard mode, a printer class mode, a composite mode, a HID mode, a composite mode, and a native mode, among others. Different types/device classifications of peripheral devices can operate in different operating modes. For example, a receipt printer can be programmed to operate in COM mode, HID mode, composite mode, printer class mode, or native mode, while a scanner can be programmed to operate in HID mode, composite mode, COM mode, or keyboard mode. However, this disclosure is not so limited.

Thus, the configuration file accessed by the computing device can be based on the type and/or device classification of the detected peripheral device. Additionally, the accessed configuration file can include a plurality of operating modes associated with the detected peripheral device, as well as instructions to apply each of the plurality of operating modes. This can allow the computing device to easily identify and apply an operating mode associated with the detected peripheral device. In some examples, the computing device can identify one of the plurality of operating modes to apply to the detected peripheral device.

In some examples, the computing device can display the plurality of operating modes associated with the detected peripheral device. As described herein, the computing device can include a user interface. The plurality of operating modes can be displayed on a display of the computing device and the user can be prompted to select one of the plurality of operating modes via the user interface of the computing device. For example, if the computing device detects a peripheral device associated with a POS printer device class, such as a receipt printer, a plurality of operating modes compatible with the POS printer device class can be displayed on the display of the computing device. One of the plurality operating modes can be selected utilizing the display, such as keyboard mode, HID mode, COM mode, or composite mode.

The memory resource 102 may store instructions 108 which may be executed by a processing resource to apply one of the plurality of operating modes to the detected peripheral device. Upon selection of an operating mode, the computing device can apply (e.g., program) the identified (e.g., selected) operating mode to the detected peripheral device. The configuration file can include instructions to apply the settings associated with the identified operating mode. For example, if keyboard mode is identified, the configuration file can include instructions to apply settings associated with keyboard mode. This can allow for operating modes to be automatically applied to the peripheral device through the BIOS layer without a technician manually applying the operating modes.

In some examples, the computing device can determine a computing state (e.g., a power state) of the computing device, where the computing state of the peripheral device can correspond to the computing state of the computing device. The computing state of the computing device can be determined via the BIOS. A computing state can describe the power consumption of the system as a whole. For example, the POS system can support a number of computing states, such as a docked state and an undocked state, among others.

In such an example, the computing device can control the computing state of the peripheral device based on the computing state of the computing device. Controlling the computing state of the peripheral device can include at least one of enabling a function within a peripheral device class, disabling a function within the peripheral device class, hiding the peripheral device, and unhiding the peripheral device. For instance, a function of a retail scanner can include reading a number of types of barcodes. However, when the retail scanner is enabled to read all supported barcodes, it may take a lot of time for the device to sort through all barcodes to decode. Thus, the computing device may enable the barcodes that a user (e.g., a retail store) supports/uses. This may allow for quicker return results than if the retail scanner is enabled to read all supported barcodes. The computing device may also disable certain symbology to prevent the retail scanner from reading unwanted barcodes. Additionally, hiding and unhiding devices can be made at the BIOS level where the BIOS can turn on/off a USB data line upon detecting/scanning a device descriptor table. For example, upon detecting a retail scanner device class or identification code, then the computing device can provide an option to hide/unhide the retail scanner from being detected at an operating system (OS) layer. However, this disclosure is not so limited.

Based on the power state of the computing device, the BIOS can control functions of the peripheral device. For example, the BIOS can disable a function of the peripheral device when the computing device is operating in a first power state and enable the function of the peripheral device when the computing device is operating in a second power state. In another example, the BIOS can hide the peripheral device when the computing device is operating in a first power state and unhide the peripheral device when the computing device is operating in a second power state. This can allow for easy control, by the computing device, of the computing state of the peripheral device without a technician manually controlling the computing state of the peripheral device.

Figure 2:
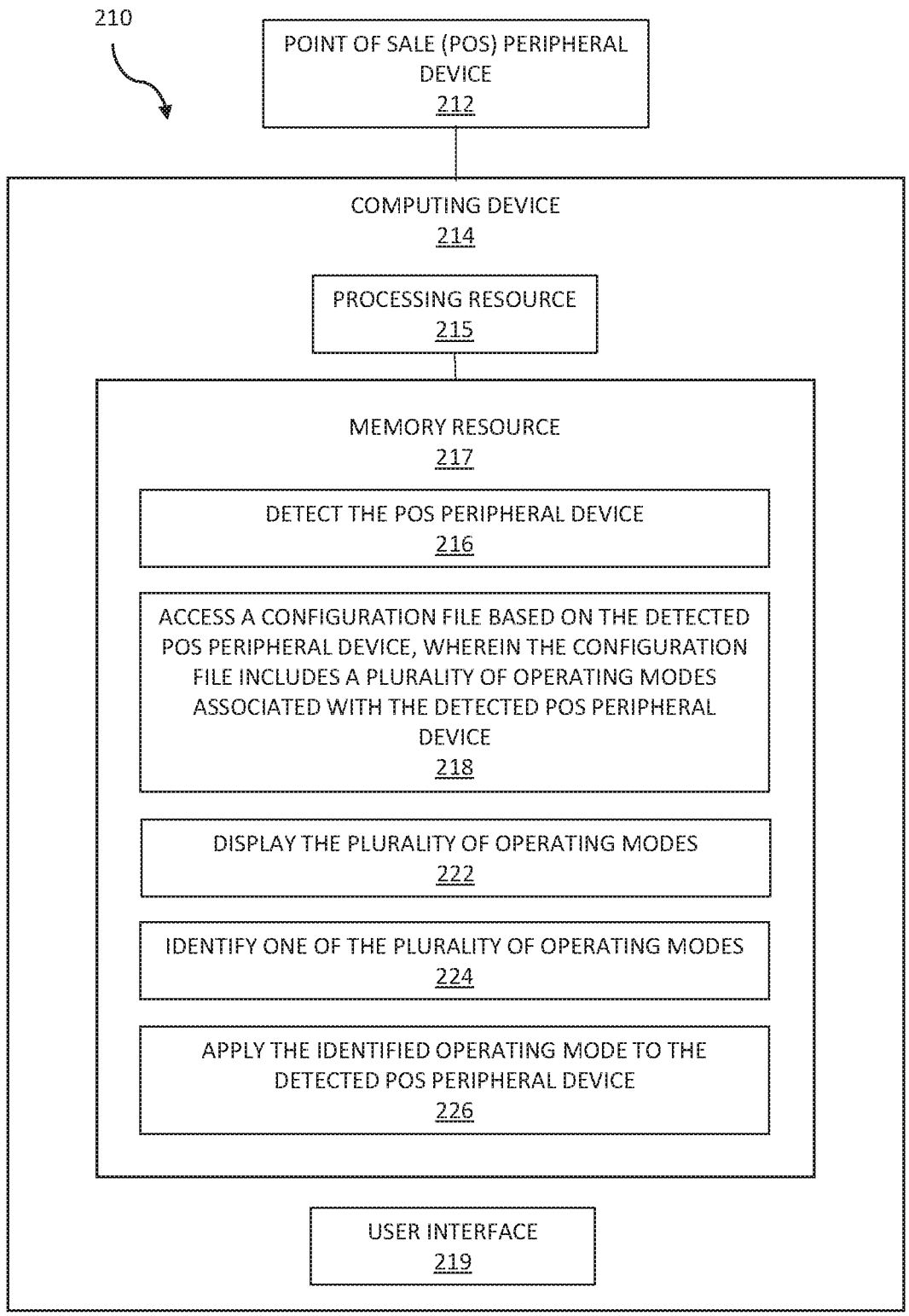
FIG. 2 illustrates an example of a system for applying an operating mode to a point of sale peripheral device consistent with the disclosure.

FIG. 2 illustrates an example of a system 210 for applying an operating mode to a point of sale peripheral device 212 consistent with the disclosure. The system 210 can include a peripheral device 212 (e.g., a point of sale peripheral device) and a computing device 214.

The computing device 214 can include a processing resource 215, a memory resource 217, and a user interface 219. The memory resource 217 can be any type of storage medium that can be accessed by the processing resource 215 to perform various examples of the present disclosure. For example, the memory resource 217 can be a non-transitory computer readable medium having computer readable instructions (e.g., computer program instructions) stored thereon that are executable by the processing resource 215 for applying an identified operating mode to the peripheral device (e.g., the point of sale peripheral device).

As shown in FIG. 2, computing device 214 can include a user interface 219. A user can interact with computing device 212 via user interface 219. For example, user interface 219 can provide (e.g., display) information to and/or receive information from (e.g., input by) the user of computing device 214. For instance, as described herein (e.g., in connection with FIG. 1) computing device 214 can display a plurality of operating modes associated with a detected peripheral device via user interface 219. The plurality of operating modes can be provided using a configuration file accesses by computing device 214. One of the plurality of operating modes can be selected via user interface 219 by the user. This can allow for the identified operating mode to be applied to the detected peripheral device.

The processing resource 215 of the computing device 214 can execute instructions 216 to cause the computing device 214 to detect the peripheral device 212. The peripheral device 212 can be a keyboard, a receipt printer, a scanner, a bar code scanner, a display, or a card reader. However, this disclosure is not so limited. In some examples, the computing device 214 can use a basic input/output system (BIOS) initialization code to detect the peripheral device 212 that is coupled to the computing device 214.

As described herein, the computing device 214 can detect the peripheral device 212 upon start-up of the computing device 214 by detecting a device classification and/or a device identification code of the peripheral device 212. For example, the computing device 214 can detect whether the peripheral device 212 is associated with a device classification, such as a POS printer device class, a scanner device class, or a line display device class, based on the device identification code of the peripheral device.

The processing resource 215 of the computing device 214 can execute instructions 218 to cause the computing device 214 to access a configuration file based on the detected peripheral device 212, wherein the configuration file includes a plurality of operating modes associated with the detected peripheral device 212. Configuration files can be stored within a local database, which may be accessed by the computing device 214.

As described herein, upon start-up of the computing device 214, a configuration file can be accessed via the computing device 214. The computing device 214 can apply the parameters and initial settings to the peripheral device 212 as indicated by the configuration file. Additionally, the computing device 214 can access a configuration file associated with the detected peripheral device 212. For example, if the computing device 214 detects a receipt printer, the computing device 214 can access a configuration file associated with a receipt printer.

As described herein, the configuration file can include a plurality of operating modes, such as a COM mode, a keyboard mode, a printer class mode, a composite mode, a HID mode, and a native mode. However, this disclosure is not so limited. Additionally, configuration files can correspond to different types/device classifications of peripheral devices. Thus, a configuration file can contain operating modes compatible with the detected peripheral device 212. For example, a configuration file corresponding to a receipt printer can include instruction to apply COM mode, HID mode, composite mode, printer class mode, and native mode, while a configuration file corresponding to a scanner can include instructions to apply HID mode, composite mode, COM mode, and keyboard mode.

The processing resource 215 of the computing device 214 can execute instructions 222 to cause the computing device 214 to display the plurality of operating modes. As described herein, the plurality of operating modes associated with the detected peripheral device 212 can be displayed on a display of the computing device 214. For example, if a receipt printer is detected by the computing device 214, operating modes compatible with a receipt printer can be displayed, such as COM mode, HID mode, composite mode, printer class mode, and native mode.

The processing resource 215 of the computing device 214 can execute instructions 224 to cause the computing device 214 to identify one of the plurality of operating modes. As described herein, a user can be prompted to select one of the plurality of operating modes via the user interface of the computing device 214. For example, a user can identify (e.g., select) one of the plurality of operating modes displayed that can be applied to the detected peripheral device 212. In another example, the computing device can identify one of the plurality of operating modes to be applied to the detected peripheral device.

The processing resource 215 of the computing device 214 can execute instructions 226 to cause the computing device 214 to apply the identified operating mode to the detected peripheral device 212. As described herein, the configuration file can include instructions to apply the settings associated with the identified operating mode. For example, if COM mode is identified (e.g., selected), the configuration fie can include instructions to apply settings associated with COM mode. This can allow for operating modes to be automatically applied to the peripheral device without a technician manually applying the operating modes.

Figure 3:
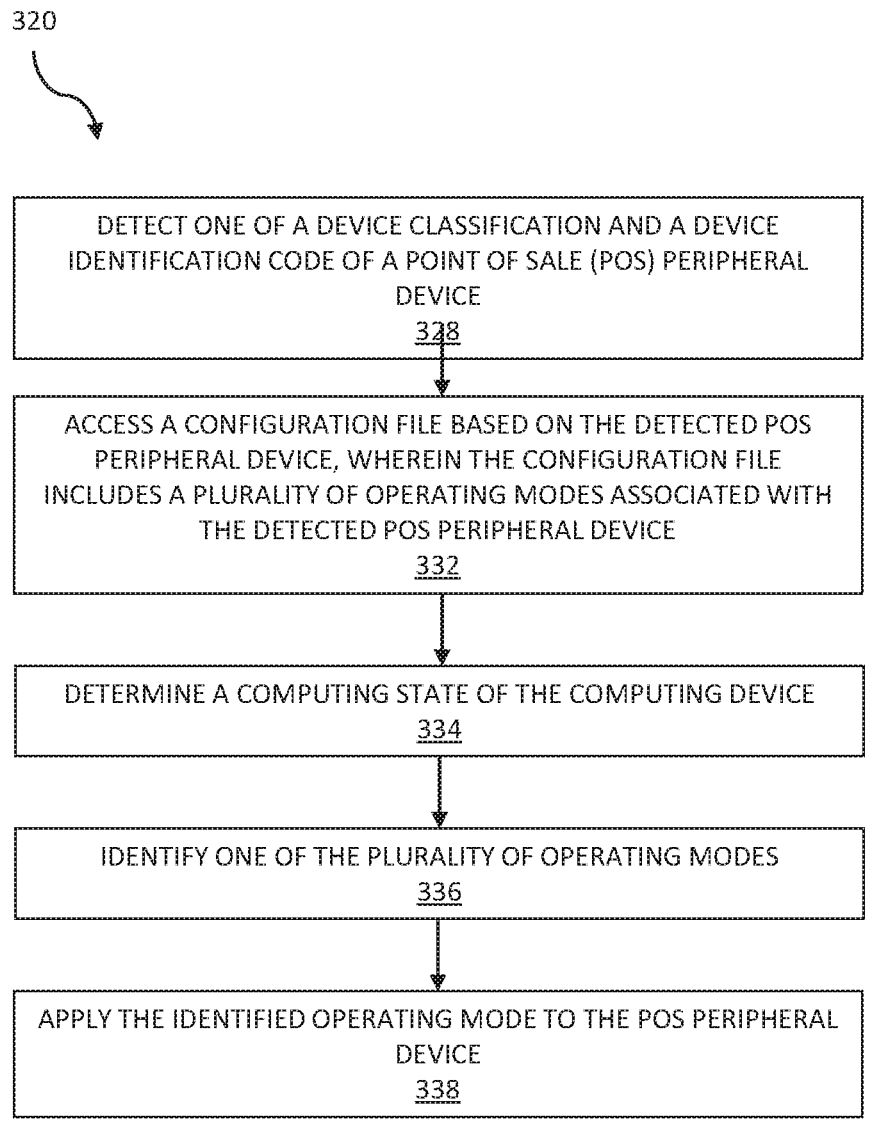
FIG. 3 illustrates an example of a method for applying an operating mode to a point of sale peripheral device consistent with the disclosure.

FIG. 3 illustrates an example of a method for applying an operating mode to a point of sale (POS) peripheral device consistent with the disclosure. The POS peripheral device can be, for example, peripheral device 212 previously described in connection with FIG. 2. For example, the peripheral device can be detected and programmed by a computing device upon start-up of the computing device.

At 328, the method 320 can include detecting, by a computing device, a device classification and a device identification code of a peripheral device. The device classification and the device identification code of a peripheral device can be detected by the computing device, for example, in a manner analogous to that previously described in connection with FIGS. 1 and 2.

At 332, the method 320 can include accessing, by the computing device, a configuration file based on the detected peripheral device, wherein the configuration file includes a plurality of operating modes associated with the detected peripheral device. The configuration file can be accessed by the computing device, for example, in a manner analogous to that previously described in connection with FIGS. 1 and 2. As described herein, the accessed configuration file can be based on the detected peripheral device. The configuration file can include a plurality of operating modes associated with the detected peripheral device, such as a COM mode, a keyboard mode, a printer class mode, a composite mode, a HID mode, a composite mode, and a native mode, among others.

At 334, the method 320 can include determining, by the computing device, a computing state of the computing device. The computing state of the computing device can be determined, for example, in a manner analogous to that previously described in connection with FIG. 1. As described herein, the computing device can control the computing state of the peripheral device based on the computing state of the computing device.

At 336, the method 320 can include identifying, by the computing device, one of the plurality of operating modes. One of the plurality of operating modes can be identified, for example, in a manner analogous to that previously described in connection with FIGS. 1 and 2. As described herein, the identified operating mode can be selected via a user interface of the computing device.

At 338, the method 320 can include applying, by the computing device, the identified operating mode to the peripheral device. The identified operating mode can be applied to the peripheral device, for example, in a manner analogous to that previously described in connection with FIGS. 1 and 2. As described herein, the peripheral device can be programmed to operate in the operating mode. This can allow the computing device to apply an operating mode to the peripheral device, as well as control the computing state of the peripheral device without the use of a technician manually performing such tasks.

In the foregoing detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

The figures herein follow a numbering convention in which the first digit corresponds to the drawing figure number and the remaining digits identify an element or component in the drawing. Similar elements or components between different figures can be identified by the use of similar digits. For example, 221 can reference element "21" in FIG. 2, and a similar element can be referenced as 321 in FIG. 3. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense.

What is claimed:

1. A non-transitory machine-readable medium storing instructions executable by a processing resource to:
   detect a peripheral device coupled to a computing device at startup of the computing device;
   access a configuration file for the peripheral based on the detected peripheral device, wherein the configuration file includes a plurality of operating modes associated with the detected peripheral device and provides parameters and initial settings for an operating system for the plurality of operating modes;
   apply a first operating mode from the plurality of operating modes to the detected peripheral device at startup of the computing device;
   determine a power state of the computing device related to a power mode of the computing device;
   alter the peripheral device from the first operating mode to a second operating mode to alter the parameters and initial settings for the operating system in response to the determined power state of the computing device; and
   prevent a particular function of the peripheral device from being detected responsive to the computing device operating in a first power state and allow the particular function of the peripheral device to be detected responsive to the computing device operating in a second power state.

2. The medium of claim 1, wherein the peripheral device is a barcode scanner associated with a point of sale system and the first operating mode allows the barcode scanner to search a first quantity of barcode type and the second operating mode allows the barcode scanner to search a second quantity of barcode type.

3. The medium of claim 1, wherein each of the plurality of operating modes is based on an identified device classification of the detected peripheral device.

4. The medium of claim 1, wherein the instructions to detect the peripheral device include instructions to detect a device classification of the peripheral device.

5. The medium of claim 1, wherein the instructions to detect the peripheral device include to detect a device identification code of the peripheral device.

6. The medium of claim 1, wherein the configuration file is stored within a System Management BIOS (SMBIOS) table.

7. The medium of claim 1, wherein the plurality of operating modes includes a communication (COM) mode, a keyboard mode, a printer class mode, a composite mode, a human interface device (HID) mode, a composite mode, and a native mode.

8. A system, comprising:
   a point of sale (POS) peripheral device coupled to a computing device; and
   the computing device comprising instructions to:
   detect the POS peripheral device;

access a configuration file based on the detected POS peripheral device, wherein the configuration file includes a plurality of operating modes associated with the detected POS peripheral device and provides parameters and initial settings for an operating system for the plurality of operating modes;

display the plurality of operating modes;

identify one of the plurality of operating modes;

apply the identified operating mode to the detected POS peripheral device at startup of the computing device;

determine a power state of the computing device related to a power mode of the computing device;

alter the POS peripheral device from the identified operating mode to a different operating mode to alter the parameters and initial settings for the operating system in response to the determined power state of the computing device; and prevent a particular function of the POS peripheral device from being detected responsive to the computing device operating in a first power state and allow the particular function of allow the POS peripheral device to be detected responsive to the computing device operating in a second power state.

9. The system of claim 8, wherein the computing device uses a basic input/output system (BIOS) initialization code to detect the POS peripheral device.

10. The system of claim 8, wherein the identified operating mode is selected via a user interface of the computing device.

11. The system of claim 8, wherein the peripheral device is one of a POS printer device class, a scanner device class, or a line display device class.

12. A method, comprising:

detecting, by a computing device, one of a device classification and a device identification code of a point of sale (POS) peripheral device;

accessing, by the computing device, a configuration file based on the detected POS peripheral device, wherein the configuration file includes a plurality of operating modes associated with the detected POS peripheral device and provides parameters and initial settings for an operating system for the plurality of operating modes;

determining, by the computing device, a computing state of the computing device related to a power mode of the computing device;

identifying, by the computing device, one of the plurality of operating modes;

applying, by the computing device, the identified operating mode to the POS peripheral device at startup of the computing device;

altering, by the computing device, the POS peripheral device from the identified operating mode to a different operating mode to alter the parameters and initial settings for the operating system in response to the determined computing state of the computing device; and preventing a particular function of the POS peripheral device from being detected responsive to the computing device operating in a first power state and allowing the particular function of the POS peripheral device to be detected responsive to the computing device operating in a second power state.

13. The method of claim 12, wherein altering the identified operating mode to a different operating mode includes controlling, by the computing device, the computing state of the POS peripheral device based on the computing state of the computing device.

14. The method of claim 13, wherein controlling the computing state of the POS peripheral device includes at least one of:

enabling a function within a POS peripheral device class;

disabling the function within the POS peripheral device class;

hiding the POS peripheral device; and unhiding the POS peripheral device.

15. The method of claim 12, wherein the device classification and the device identification code of the POS peripheral device are detected upon start-up of the computing device.

* * * * *